United States Patent

Alasti

[11] Patent Number: 6,160,143
[45] Date of Patent: Dec. 12, 2000

[54] METHOD FOR THE CONCENTRATION AND SEPARATION OF STEROLS

[75] Inventor: Perry Alasti, Framingham, Mass.

[73] Assignee: Artisan Industries Inc., Waltham, Mass.

[21] Appl. No.: 09/507,405

[22] Filed: Feb. 18, 2000

[51] Int. Cl.⁷ ............................................ C11B 3/00
[52] U.S. Cl. ............................................ 554/195
[58] Field of Search ........................................ 554/195

[56] References Cited

U.S. PATENT DOCUMENTS

| | | |
|---|---|---|
| 3,496,159 | 2/1970 | Spence . |
| 3,985,606 | 10/1976 | Baird et al. . |
| 4,076,700 | 2/1978 | Harada et al. . |
| 4,692,550 | 9/1987 | Engbert et al. . |
| 4,935,171 | 6/1990 | Bracken . |
| 5,028,297 | 7/1991 | Bracken . |
| 5,090,985 | 2/1992 | Soubeyrand et al. . |
| 5,097,012 | 3/1992 | Thies et al. . |
| 5,487,817 | 1/1996 | Fizet . |
| 5,582,692 | 12/1996 | Baird . |
| 5,646,306 | 7/1997 | Elsasser, Jr. . |
| 5,658,433 | 8/1997 | Baird . |
| 5,770,682 | 6/1998 | Ohara et al. . |

FOREIGN PATENT DOCUMENTS 0226245  6/1987  European Pat. Off. .

Primary Examiner—Deborah D. Carr
Attorney, Agent, or Firm—Richard P. Crowley

[57] ABSTRACT

A method for the concentration and separation of a sterol-containing plant mixture employing a single, rotary, thin film horizontal evaporator for saponification of the mixture in a reaction zone, evaporation of volatile by-products, and discharge of a soap product and free sterol mixture in an evaporation zone for subsequent separation, purification, and recovery of free sterols and a soap product.

19 Claims, 1 Drawing Sheet

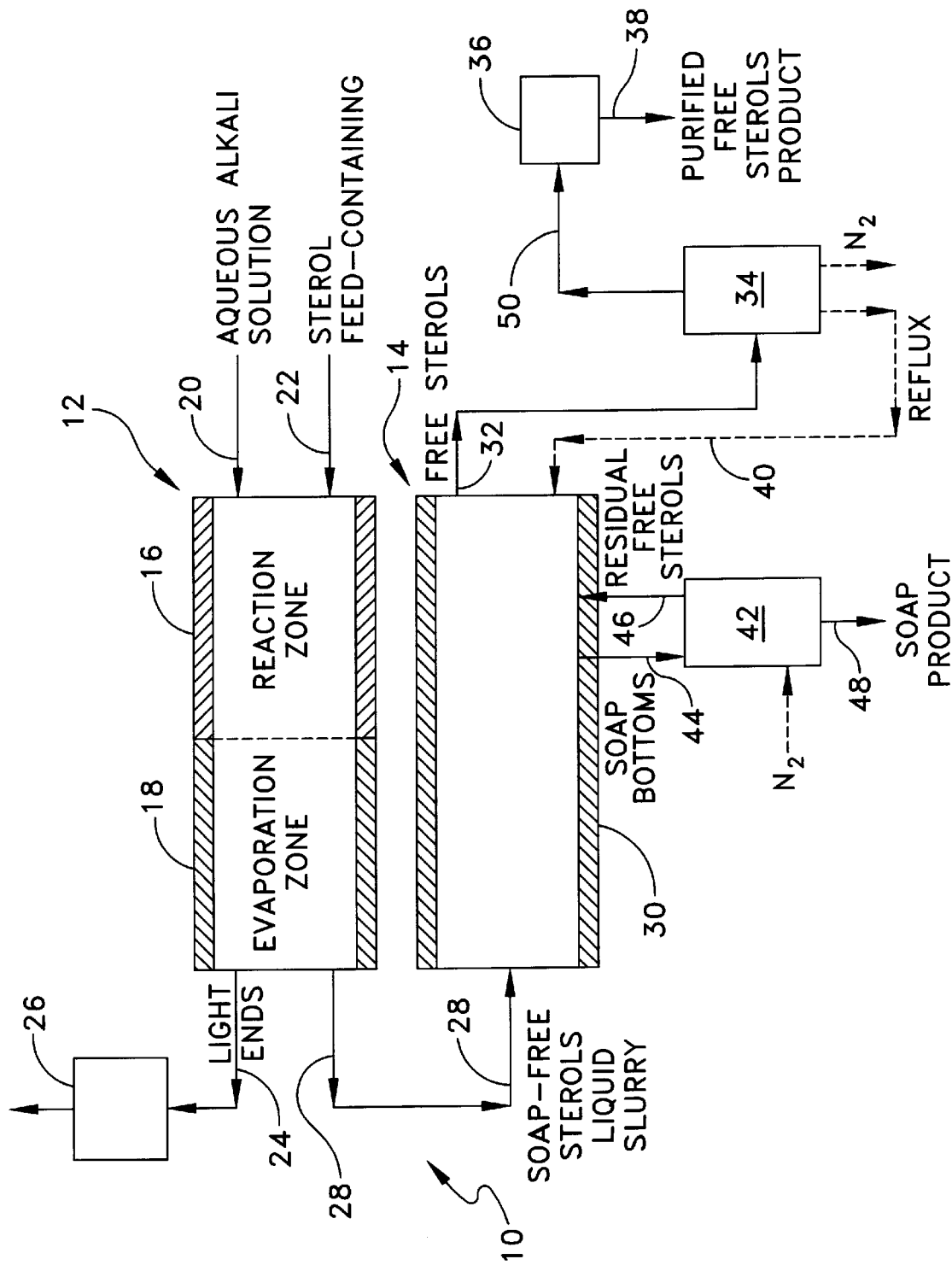

METHOD FOR THE CONCENTRATION AND SEPARATION OF STEROLS

BACKGROUND OF THE INVENTION

Vegetable oils and fats, such as: soybean oil; cotton seed oil; palm oil; sunflower oil; rice oil; and other similar oils contain sitosterol, campesterol, stigmasterol, and various other sterols at levels generally less than 0.5 percent weight. These oils are treated by saponification, extraction, and crystallization, followed by distillation and high pressure propane extraction to concentrate the sterols.

The concentrated sterol mixture is often the by-product of commercial processes for obtaining soap during a vegetable oil deodorization process. In the first instance, soap is extracted by saponifying the sterol esters to yield the soap and the free sterols. In the vegetable oil deodorization process, the concentrated sterol mixture is obtained by steam stripping the undesirable odors generally present in, for instance, crude soybean oil. The free sterol obtained from soap processing is then conventionally separated from other components present in the sterol mixture by solvent extraction.

A variety of assorted processes have been disclosed for the recovery and purification of sterols from natural products employing evaporative and distillation techniques.

U.S. Pat. No. 4,076,700, issued Feb. 28, 1978, hereby incorporated by reference, discloses a process for the recovery of fatty and rosin acids and separating sitosterol. The process involves the separate saponification, with an alkali solution of tall oil, in a saponification vessel. The soap formed and other unsaponifiables, like sitosterol, are subsequently processed through a first, vertical, thin film evaporator to evaporate light ends and then a second, vertical, thin film evaporator to recover the sterol sitosterol.

U.S. Pat. No. 5,487,817, issued Jan. 30, 1996, hereby incorporated by reference, involves the recovery of tocopherols and sterols from vegetable sources, by the esterification of the sterols and subsequent distillation to isolate the sterols.

U.S. Pat. No. 5,646,311, issued Jul. 8, 1997, and hereby incorporated by reference, relates to the recovery of tocopherols, by distillation of fatty acid esters in a packed column, followed by wiped or thin film evaporation and then crystallization of the sterols from a solvent blend.

U.S. Pat. No. 5,658,433, issued Aug. 19, 1997, and U.S. Pat. No. 5,582,692, issued Dec. 10, 1996, both hereby incorporated by reference, concern the recovery and purification of tocopherols (vitamin E), by employing a distillation column and a rotary thin film evaporator.

It is desirable to provide a rapid, efficient, high yield, economic, solvent-free method and system for the concentration and recovery of purified, free sterols from natural fats and oils containing: free sterols; sterol esters; and combinations thereof, typically, from natural oil and fat by-product residues or distillates containing fatty acids, glycerides, and sterol esters.

SUMMARY OF THE INVENTION

The invention relates to a system and method for the concentration, separation, and purification of free sterols or similar products from sterol-containing natural products.

The invention comprises a method for the concentration and separation of free sterols from a sterol ester-containing, organic liquid material, which method comprises providing a first rotary, generally horizontal, agitated thin film apparatus having a one end and an other end and having two external jackets to provide an internal, first thin film reaction zone and a second, thin film evaporation zone. The invention comprises introducing a sterol ester-containing organic feed material into the first zone; introducing an aqueous alkali solution into the first zone to saponify said material at a controlled temperature and for a selected time to provide a saponification reaction mixture of an alkali soap, free sterols, water, and light hydrocarbons; heating at a controlled temperature, the reaction mixture from the first reaction zone in the second evaporation zone; withdrawing from the second zone, a light end vapor mixture comprising water, glycerol, and light hydrocarbons; withdrawing from the second free sterols along with other nonsaponifiables or unsaponifiables, such as, tocopherols and tocotrienols; and heating the liquid slurry mixture to separate and obtain a free sterol and an alkali soap product.

Further, the invention comprises a method for the reaction and concentration of a liquid organic saponifiable material and a nonsaponifiable material feed mixture, which method comprises providing a first rotary, generally horizontal, thin film apparatus having a one end and an other end and having two external jackets to provide an internal, first thin film reaction zone and a second thin film evaporation zone. The invention comprises introducing the feed mixture into the reaction zone; introducing an alkali as a reactant feed stream into the reaction zone to saponify the saponifiable material to provide a reaction mixture from the reaction zone comprising an alkali-saponification product; the nonsaponifiable material and a volatile liquid comprising water and hydrocarbons; evaporating the volatile liquid from the evaporation zone as a vapor; and withdrawing the alkali-saponified product and the nonsaponifiable material from the evaporation zone.

The invention also comprises a method for the saponification, evaporation, and separation of a liquid plant mixture comprising saponifiable fatty material and nonsaponifiable sterols, which method comprises carrying out in a thin film on the walls of an evaporator, a saponification reaction of the plant mixture with an alkali solution to provide a reaction mixture comprising a fatty soap product, volatile by-products and free sterols. The invention comprises evaporating from the thin film reaction mixture and discharging the volatile by-products from the evaporator; discharging from the evaporator, the soap by-products and free sterols as a liquid slurry.

In one embodiment, the system is comprised of the following components: a first, horizontal, rotary, thin film evaporator/processor (such as a ROTOTHERM®R, a registered trademark of Artisan Industries Inc. of Waltham, Mass.) comprised of two separate jacketed processing zones. In the first zone, an aqueous alkali solution, such as either sodium or potassium hydroxide is simultaneously introduced along with the preheated, sterol-containing source material. Due to the highly turbulent film and the short residence time of the thin film processor, nearly complete saponification in the first reaction zone occurs in, say less than 60 seconds, for example 30 to 120 seconds, producing free sterols and soap in proportion to the stoichiometric ratio of the reactants. The soap containing the free sterol and the other materials generally present, such as, hydrocarbons along with water and glycerol, proceed to the second processing zone where heat is applied to vaporize the light ends and the soap and free sterols are discharged as a slurry mixture. A short rectification column is used to remove the light ends, while minimizing entrainment and possible carry-over of the desirable sterol product. In most instances, a wire mesh mist eliminator suffices.

A second, horizontal, rotary, thin film evaporator (preferably a ROTOTHERM®E) receives the slurry mixture where the free sterols contained in the soap from the reactor bottoms is evaporated.

A low pressure drop fractionation column is used to improve the purity of the recovered sterols from the second evaporator.

A falling film stripper (preferably an Artisan® Evaporator/stripper) is used to strip residual free sterols from the soap to improve the yield of the recovered sterols.

The feed mixture to the first, thin film reactor-evaporator apparatus is generally a by-product, residue, or deodorizer distillate of a natural and/or fat product containing generally above about 20 to 25 percent by weight of sterol esters to be recovered as free sterols, and more typically, above 40 to 50 percent, e.g., 50 to 65 or more percent of sterol esters. Usually, the feed mixture is preheated, e.g., 75 to 100° C.

The first processor apparatus provides integrally both an in situ reaction zone for rapid reaction saponification of the sterol-feed material in a thin film reaction zone of the sterol-feed material, and as a subsequent, in situ, thin film evaporation zone for the removal of lower boiling point products, such as, light ends from the reaction mixture and the discharge of the formed soap and free sterols as a soap slurry mixture. The first processor is temperature-jacketed to form the two processing zones in the single apparatus. The saponification reaction is an exothermic reaction, which may be controlled by the separate jacketing of the apparatus, so that the reaction process is carried out, typically from about 180 to 220° C., in a short residence time. The saponification reaction provides for a reaction mixture of the alkali soap, free sterols, water, light hydrocarbons or solvents, and glycerol.

The second evaporation process is carried out in the opposite end of the first apparatus, at a higher controlled temperature, using a steam or other fluid heating media jacket, for example, of about 260 to 290° C. to remove the light ends, i.e., hydrocarbons, glycerol, and water.

The sterol-containing soap slurry mixture discharged from the first reactor-evaporator apparatus is introduced directly as a feed into a second, horizontal, thin film apparatus, for example, operated at an evaporation temperature of about 280 to 310° C. and 5 mm mercury absolute pressure, typically, between 1 to 10 mm mercury to provide a free sterol, enriched vapor discharge stream and a free sterol-lean (molten) liquid soap. Residue-free sterol is removed from the liquid soap in a falling film stripper and the residual, free sterol vapor returned to the second apparatus. The enriched, free sterol stream from the second evaporator is purified by a low pressure drop, fractionating column; and the overhead, free sterol vapor is condensed to recover the free sterols at a high yield, typically over 90 percent, without the destruction of the sterols, and without the use of solvents.

The arrangement for the recovery and purification of the sterol-enriched, free sterol stream from the second evaporator, under inert gas nitrogen, is generally the same as illustrated and described for the recovery of vitamin E in the Baird U.S. patents supra.

While the invention will be described in connection with the reaction-evaporation processing of soap and sterols in a single, thin film, multizone reactor-evaporator processor, it is recognized that the saponification reaction of other organic fatty acids and other esters, other than sterols, may be carried out and the reaction products separated in a single, thin film processor employing different ester feed materials and to recover free alcohol products.

The feed mixture to the thin film apparatus may comprise any liquid mixture of saponifiable and nonsaponifiable materials, and whereby, upon the introduction of an alkali material, a rapid saponification is carried out in a thin film from the apparatus as a reaction with the alkali, to produce and discharge a mixture of the saponified product and free unsaponified material, while volatile materials from the reaction mixture are evaporated in the thin film evaporator zone and discharged as a vapor product from the other end of the apparatus.

The invention will be described for the purpose of illustration only in connection with certain illustrated embodiments; however, it is recognized that various changes, modifications, additions, and improvements may be made in the illustrative embodiments without departing from the spirit or scope of the invention.

BRIEF DESCRIPTION OF THE DRAWING

The drawing is a schematic illustration of a solvent-free concentration and purification system for free sterols of the invention.

DESCRIPTION OF THE EMBODIMENTS

With reference to the drawing, there is illustrated a method and system 10 for the concentration and separation of free sterols from a free sterol or sterol ester-containing mixture. The system includes a generally horizontal, thin or wiped rotary blade apparatus 12, such as a ROTOTHERM® evaporator, which is separately, externally-jacketed 16 and 18 to provide within the apparatus 12, a first, thin film reaction zone and a second, thin film evaporation zone in which the temperature within each zone may be controlled by employing heating or cooling fluids within the peripheral jackets 16 and 18. Typically, the jackets are provided with inlets and outlets for steam or suitable media. The length and extent of the reaction zone and evaporation zone are schematically illustrated, but may vary, as required, depending on the particular reaction and evaporation needs of each reaction. A feed inlet line 20 for a first reaction component, like an aqueous alkali solution and a feed inlet line 22 for a second reaction component, like a vegetable oil, sterol-containing feed is provided at the one end for the generally simultaneous introduction of the reaction components to be reacted into the reaction zone of apparatus 10.

A withdrawal line 24 from the evaporation zone is provided for the removal of volatile vapor components of the reaction mixture of the reaction zone, such as light ends, which vapor light ends are directed to a distillation column or mist eliminator 26 for recovery or further treatment. The apparatus 10 includes a discharge line 28 from the evaporation zone for the discharge of the non-volatile reaction products, such as, for example, a liquid slurry mixture comprising the soap produced by the reaction mixture and the free sterols. In one embodiment, the aqueous alkali solution comprises a sodium or potassium hydroxide solution, generally in a stoichiometric mixture amount or slightly greater, to react with a sterol ester-containing feed mixture, typically, a by-product of a deodorization or bottom treatment process for a plant or vegetable oil, like tall oil or palm oil and which contain commercially acceptable amounts of sterols for recovery.

The method is employed usefully where the feed mixture contains free sterols and oils, and wherein, the oil (mono, di, and triglycerides) is saponified. The method simplifies the subsequent separation by evaporation or distillation of the free sterols.

A typical feed mixture of saponifiable and nonsaponifiable materials would comprise: fatty acids and oils; free sterols; sterol esters or mixtures; mixed glycerides; tocopherols; and other components. The feed mixture usually is preheated, e.g., 80 to 120° C. A stoichiometric saponification reaction occurs in the thin film mixture in the reaction zone on the internal cylindrical wall of the apparatus 10. The saponification reaction mixture produced comprises: the alkali soap; various free sterols; water; glycerol; and light ends, like hydrocarbons. The saponification film reaction is exothermic and is carried out at about 190 to 210° C. and over a short time period in the reaction zone of less than 60 seconds. The evaporation zone is temperature controlled, such as at 260 to 280° C., to remove undesired volatiles.

The molten liquid slurry of line 28 is introduced into a second, rotary wiped, thin film apparatus of 14, like a ROTOTHERM® apparatus as the feed mixture, which apparatus 14 has a single zone, temperature control jacket 30 to control the separation temperature, typically about 290 to 325° C. at 5 mm mercury absolute pressure. The apparatus 14 includes a free sterol withdrawal line 32 at the opposite end, for the discharge of the free sterols in vapor form, while the liquid soap bottoms are withdrawn through discharge line 44.

Optionally, but preferably, to obtain high purity sterols at high yields, subsequent treatment of the free sterol product and soap bottoms are carried out.

The method and system 10 includes a falling film stripper apparatus 42 to receive the soap bottoms from line 44 and to discharge, in vapor form, directly into the apparatus 14 a residual, free sterol vapor through line 46, which residual free sterols are recovered from the soap bottoms in the stripper 42, while the liquid soap product is withdrawn through line 48.

The system 10 includes a low pressure drop, fractionating column 34 to receive the sterol vapors line 32 for purification of the free sterols. The column 34 includes a bottom reflux return line 40 for recycle of bottoms product to the apparatus 14, and an overhead condenser 36 to condense free sterols withdrawn from the upper portion of the column 34 through line 50, so that pumped liquid, free sterols are recovered through line 38 for recovery or further separation and treatment of the free sterols. Generally, as shown in the apparatus, 40, 42, and 34 are associated lines which are operated under vacuum in the presence of an inert gas, like nitrogen gas (see dotted lines), which gas is introduced through the separation and purification section of the system 10.

The system and operation as described, avoid the use of separate saponification vendors and long saponification times and provide for the efficient, rapid, high yield recovery of nonsaponified products, like free sterols from a saponifiable-nonsaponified feed mixture.

What is claimed is:

1. A method for the concentration and separation of free sterols from a feed source which comprises sterol-containing material and saponifiable material, which method comprises:
   a) providing a first, rotary, generally horizontal, thin film apparatus having a one end and an other end and having two external jackets to provide a first, internal, thin film reaction zone and a second, internal, thin film evaporation zone;
   b) introducing the feed source into the first zone;
   c) introducing an aqueous alkali solution into the first zone to saponify said saponifiable material at a controlled temperature and for a selected time to provide a saponification reaction mixture of an alkali soap, free sterols, water, and light hydrocarbons;
   d) heating at a controlled temperature, the reaction mixture from the first zone reaction in the second evaporation zone;
   e) withdrawing from the second zone, a light end vapor mixture comprising water and light hydrocarbons;
   f) withdrawing from the second zone, a liquid slurry mixture comprising an alkali soap and free sterols; and
   g) heating the liquid slurry mixture to separate and obtain a free sterol and an alkali soap product.

2. The method of claim 1 which includes heating the liquid slurry mixture employing a second, rotary, generally horizontal, thin film apparatus and withdrawing an alkali soap product mixture and withdrawing a vapor product of free sterols.

3. The method of claim 2 which includes stripping in a falling film stripper, the liquid alkali soap mixture and withdrawing a vapor residual mixture of free sterols and a sterol-free alkali soap product, and introducing the free sterol residual mixture into the second apparatus.

4. The method of claim 3 which includes purifying the vapor residual mixture of free sterols in a low pressure drop, fractionating column to provide an overhead product of purified free sterols.

5. The method of claim 1 which includes employing a rectification column for the light ends mixture withdrawn from the second zone of the first apparatus.

6. The method of claim 1 wherein the aqueous alkali solution comprises sodium or potassium hydroxide.

7. The method of claim 1 wherein the feed source comprises a plant or vegetable oil having generally greater than about 25 percent by weight of sterol-containing material.

8. The method of claim 1 wherein the feed material comprises free sterols or sterol esters from a deodorization process.

9. The method of claim 1 wherein the controlled process temperature in the first zone ranges from about 170 to 210° C.

10. The method of claim 1 wherein the selected reaction time in the first zone ranges from about 30 to 120 seconds.

11. The method of claim 1 wherein the controlled temperature in the second zone ranges from about 250 to 290° C.

12. The method of claim 2 wherein the heating of the liquid slurry soap mixture in the second apparatus ranges from about 280 to 320° C. and 1 to 10 mm mercury absolute pressure.

13. The method of claim 4 wherein the yield of free sterols from the feed material is greater than about 90 percent by weight.

14. The method of claim 1 wherein the feed materials comprise over about 50 percent by weight of sterol esters, and the free sterols product comprises sitosterol, campesterol, and stigmasterol.

15. A method for the reaction and concentration of a liquid, organic, saponifiable material and a nonsaponifiable material feed mixture, which method comprises:
   a) providing a first, rotary, generally horizontal, thin film apparatus having a one end and an other end and having two external jackets to provide a first, thin film reaction zone and a second thin film evaporation zone;
   b) introducing the feed mixture into the reaction zone;
   c) introducing an alkali as a reactant feed stream into the reaction zone to saponify the saponifiable material, to provide a reaction mixture from the reaction zone comprising an alkali-saponified product, the nonsaponifiable material, and a volatile liquid comprising water and hydrocarbons;

d) evaporating the volatile liquid from the evaporation zone alone as a vapor; and e) withdrawing the alkali-saponified product and the nonsaponifiable material from the evaporation zone.

16. The method of claim 15 wherein the feed mixture comprises a vegetable or plant oil product which contains fatty acids, fatty oils, and sterol esters or free sterols.

17. The method of claim 15 wherein the alkali comprises an aqueous solution of an alkali or alkali earth hydroxide.

18. The method of claim 15 which includes heating and separating the withdrawn saponified and nonsaponified material, to provide a saponified product material and a nonsaponifiable free sterol product.

19. A method for the saponification, evaporation, and separation of a liquid plant mixture comprising saponifiable fatty material and nonsaponifiable sterols, which method comprises:

a) carrying out in a thin film on the walls of an evaporator, a saponification reaction of the plant mixture with an alkali solution to provide a reaction mixture comprising a fatty soap product, volatile by-products, and free sterols;

b) evaporating the thin film reaction mixture and discharging the volatile by-products from the evaporator;

c) discharging from the evaporator, the soap by-products and free sterols as a liquid slurry.

* * * * *